(12) United States Patent
Cairns (10) Patent No.: US 8,259,349 B2
(45) Date of Patent: Sep. 4, 2012

(54) DOCUMENT CONVERSION FOR OVERPRINTS

(75) Inventor: Glen M. Cairns, Coquitlam (CA)

(73) Assignee: Eastman Kodak Company, Rochester, NY (US)

( * ) Notice: Subject to any disclaimer, the term of this patent is extended or adjusted under 35 U.S.C. 154(b) by 1003 days.

(21) Appl. No.: 12/287,098

(22) Filed: Oct. 6, 2008

(65) Prior Publication Data

US 2010/0085583 A1 Apr. 8, 2010

(51) Int. Cl.
*G06F 15/00* (2006.01)
*G06K 1/00* (2006.01)
*G06K 9/74* (2006.01)
*G06K 9/36* (2006.01)
*H04N 1/46* (2006.01)
*G03F 3/08* (2006.01)
*G09G 5/00* (2006.01)

(52) U.S. Cl. ......... 358/1.9; 358/1.2; 358/517; 358/518; 358/540; 382/213; 382/286; 382/291; 345/619; 345/629; 345/681

(58) Field of Classification Search .................. None
See application file for complete search history.

(56) References Cited

U.S. PATENT DOCUMENTS

2005/0280847 A1 12/2005 Cairns et al.
2007/0201094 A1* 8/2007 Croft ........................... 358/1.18
2008/0186519 A1* 8/2008 Kodama ........................ 358/1.9

* cited by examiner

*Primary Examiner* — Fan Zhang
(74) *Attorney, Agent, or Firm* — Nelson Adrian Blish (57) ABSTRACT

A printing system includes a converter for replacing graphic elements of a document (100) that is subject to subsequent processing such as color matching. Conversion involves using multiply transparency in place of overprint and creating transparency groups (21, 23) to replace elements (1-4) that have subsequent elements that meet an overlapping overprint criteria. An element transparency group (21, 23) includes multiple elements based on the original element (1, 3) but with geometry and selected colorant channels modified based on the relationship between the original element (1, 3) and each subsequent original element (1-4) meeting the criteria.

4 Claims, 7 Drawing Sheets
(7 of 7 Drawing Sheet(s) Filed in Color)

DOCUMENT CONVERSION FOR OVERPRINTS

CROSS REFERENCE TO RELATED APPLICATIONS

Reference is made to commonly-assigned U.S. patent application Ser. No. 11/122,090 (U.S. Patent Application Publication No. 2005/0280847), filed May 5, 2005, entitled SYSTEM AND METHODS FOR COLOR MATCHING OVERPRINTED DOCUMENTS, by Cairns et al., and U.S. patent application Ser. No. 11/880,380 (now U.S. Pat. No. 7,990,574), filed Jul. 20, 2007, entitled METHOD AND SYSTEM FOR CONVERTING A DOCUMENT, by Glen Cairns, the disclosures of which are incorporated herein.

FIELD OF THE INVENTION

The present invention relates in general to document images, and in particular to altering the representation of overlapping graphic objects in a document to produce visually similar results when processed.

BACKGROUND OF THE INVENTION

In the field of imaging, document files can include vector graphic elements which represent the intended appearance of a document. Some documents include graphic elements that overlap such that the overlapping colors combine to produce a different color.

The related applications identified in the cross reference disclose a few techniques for altering an original document to handle problems that can occur when overlapping graphic elements include elements that are configured to overprint. One exemplary problem is the incorrect rendering of intended color when the document is color matched. In particular, color matching can result in a change in the set of colors printed by an element so that when rendered, significant color shifts can occur in areas where overprinting elements overlap. As an example, a process color, painted by a background element in an area where a spot color overprints and overlaps, will no longer contribute to the area if color matching converts the spot color to a process recipe that paints that process color of the background. As another example, an overprinting element painting in one or more process color channels may paint in additional channels after color matching and thus prevent background color in the additional channels from contributing color in areas of overlap.

Commonly-assigned U.S. patent application Ser. No. 11/122,090 discloses converting a document by retaining original elements while adding a graphic element to the document to represent the combined color of elements that overlap in an area. While this approach produced the desired results, there is more complexity than desired (e.g. calculating the overlapped overprint areas, determining an appropriate element representation for the area and combining colors from the overlapping elements).

Commonly-assigned U.S. patent application Ser. No. 11/880,330 discloses converting a document by replacing certain graphic elements with new elements that are based on the original elements but with altered graphic attributes including transparency attributes. Although the approaches in U.S. patent application Ser. No. 11/880,330 can be less complex than those of the first related application, the size of the converted document can increase significantly because two or more replacement elements may be produced for each original element to achieve the desired results. Larger files take more resources to store and process (e.g. render). This is particularly acute when spot colorants are used.

Thus, there is still a need to have a document conversion approach that produces the desired results, is relatively simple and does not incur a large increase in the number of graphic elements.

SUMMARY OF THE INVENTION

The present invention provides simplified systems and methods for converting a document by reconfiguring graphic elements that are configured to overprint with multiply blend mode transparency and selectively adding knockout elements in areas of overlap to ensure correct combination of background color with overlapping graphic elements that have been reconfigured with multiply blend mode transparency.

According to one aspect of the present invention, graphic elements are processed in display order and for each graphic element encountered, it is determined whether the current element is overlapped by any subsequent element that is configured to overprint and paint in at least one color channel that is also painted by the current element. If there are no subsequent elements meeting the criteria and the current element is configured to overprint, the current element's overprint setting is disabled and a multiply blend mode transparency setting is enabled to ensure the correct combination of background color with the current element when the document is rendered.

If any subsequent elements meet the criteria, an isolated, knockout transparency group is configured to replace the current element. If the current element was originally configured to overprint, the transparency group is configured with a multiply blend mode to ensure the correct combination of background color with the transparency group.

Within the element transparency group, a copy of the original element is configured to paint first but with a knockout setting (e.g. disable overprint if enabled). For each original subsequent overlapping element meeting the criteria, a new knockout element is added and configured to paint only those color values painted by the original current element that can contribute background color given the foreground color painted by the subsequent element. Each new knockout element is configured with the geometry of the intersection of the current element and the original subsequent element and added to the transparency group to preserve the relative order amongst the original current and subsequent elements.

These and other aspects of the present invention are illustrated in the detailed description of the invention.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE INVENTION

According to the present invention, a document can be processed by a computerized converter to produce a new document that is visually similar to the original document. The new document can be color matched or otherwise processed, as part of the conversion or as a later step, to improve the printability of the file while striving to preserve the intent of the original document file. In particular, the intended color of overlapping element areas will be preserved even if small alterations in color values are made to overlapping graphic elements.

Figure 1A:
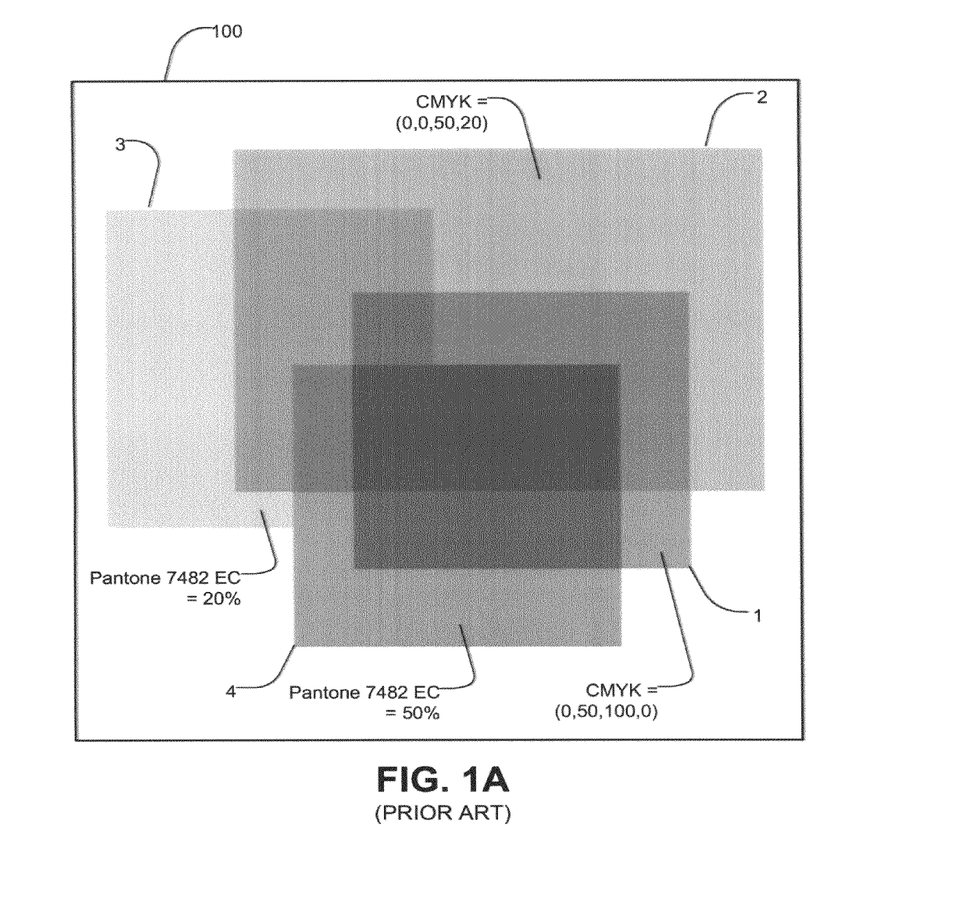
FIG. 1A is a diagram illustrating a rendering of an exemplary document with overlapping graphic elements including some configured to overprint according to the prior art.

FIG. 1A is a diagram illustrating a rendering of an exemplary document 100 with overlapping graphic elements 1-4 including some configured to overprint according to the prior art. Element 1 is configured to paint first in a DeviceCMYK color space with tint percentage values (0, 50, 100, 0) and with overprint disabled and with normal blend mode transparency and 100% opacity. Element 2 is configured to paint next in a DeviceCMYK color space with tint values (0, 0, 50, 20) and with overprint enabled and with normal blend mode transparency and 100% opacity. Element 3 is configured to paint next in a single spot colorant, namely Pantone 7482 EC, with a 20% tint value. Element 3 is also configured to paint with overprint enabled and normal blend mode transparency and 100% opacity. Element 4 is configured to paint last, similar to element 3, but with a 50% tint value.

According to popular imaging models, such as those incorporated in Adobe® products, when a foreground overprinting element overlaps a background element, the background element contributes color in the overlap area from channels not painted by the foreground object. Thus, for example, an overprinting foreground element painting a particular spot colorant should allow the color of any background element that does not paint that spot colorant. In the case where a background element paints additional colorants (e.g. process and spot colorants), the other colorants (e.g. process and different spot colorants) still contribute color to the foreground. Further, elements configured to paint in wide-gamut color spaces, such as RGB, XYZ, and LAB, are considered to paint in all process colorants for a DeviceCMYK or DeviceN color space.

When processed later (e.g. color matching or rendering), spot colorants may or may not be converted to process colorants in the target device color space (e.g. DeviceCMYK) so it is important that document conversion retain the intended color appearance whether spot conversion occurs or not. Note that for the purposes of this application, a 100% tint of Pantone 7482 EC is converted to DeviceCMYK tints of (95, 0, 90, 0). Accordingly, a 50% tint can be converted to DeviceCMYK tints of approximately (47, 0, 45, 0), and a 20% tint can be converted to DeviceCMYK tints of approximately (19, 0, 18, 0).

Figure 1B:
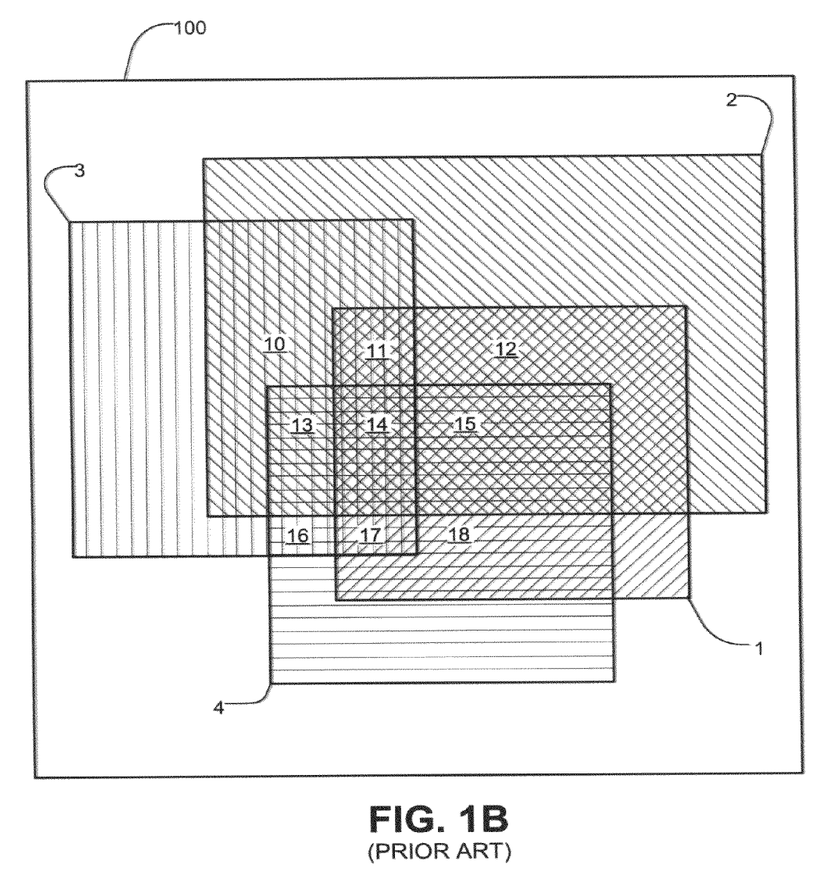
FIG. 1B is a diagram illustrating areas where graphic elements overlap in the document of FIG. 1 according to the prior art.

FIG. 1B is a diagram illustrating overlap areas 10-18 where graphic elements 1-4 overlap in document 100. In overlap area 10, for example, element 3 overprints element 2 and element 2 contributes both yellow and black tints since element 3 does not explicitly paint either of those colorants. Even if element 3 is ultimately converted to process colorants, it would paint black in addition to element 2 painting black, and in overlap area 10 a darker black tint should be painted than either element 2 or 3 would paint individually. If element 3 is not converted to process colorants, overlap area 10 will simply paint black with the 20% tint of element 2.

Overlap area 11 includes elements 3, 2, and 1 overlapping. As above, all of the tints of element 2 contribute but only the magenta tint (50%) of element 1 contributes since both elements 2 and 3 paint the yellow colorant. Overlap area 12, representing the overlap between elements 1 and 2, is similar in that element 1 only contributes magenta tint.

Overlap area 13 representing the overlap between elements 2, 3, and 4 is similar to overlap area 10, except that element 3 does not contribute any color to the area since overprinting element 4 paints in the same spot colorant.

Overlap area 14 represents the overlap between elements 1-4. Overlap area 15, represents the overlap between elements 1, 2, and 4. Both have the same appearance since, as above, element 3 does not contribute any color when overprinted by element 4. In both these areas, element 1 contributes only magenta, element 2 contributes yellow and black, and element 4 contributes the spot colorant.

Overlap area 16 represents the overlap between elements 3 and 4. Overlap area 16 has the same appearance as element 4 for the reasons given above. Overlap areas 17 and 18 have the same appearance with elements 1 and contributing color and element 3 contributing nothing. Element 1 contributes magenta and yellow while element 4 contributes spot colorant.

Figure 2:
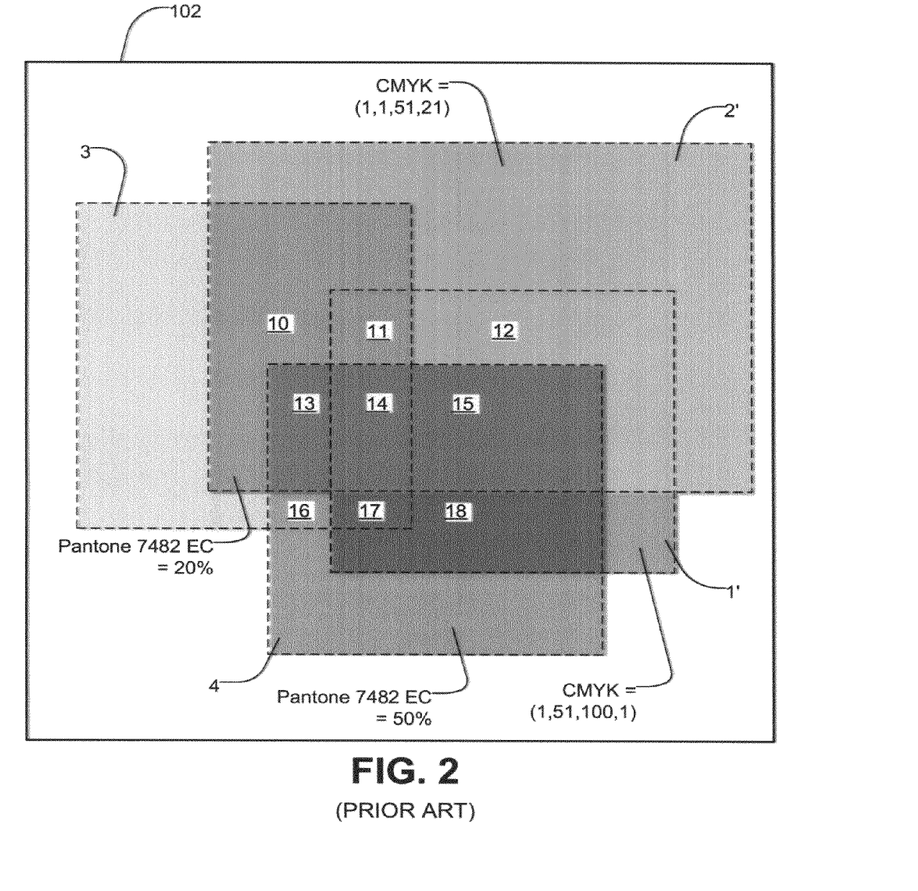
FIG. 2 is a diagram illustrating a rendering of the document of FIG. 1A after an exemplary color matching according to the prior art.

FIG. 2 is a diagram illustrating a rendering of document of FIG. 1A after an exemplary color matching according to the prior art. For example, assume that color matched document 102 has been produced by color matching document 100 so that spot colorants are preserved and all process colorant tints are nominally enriched by 1%. Color matched element 1' now paints DeviceCMYK tint values (1, 51, 100, 1). Color matched element 2' now paints DeviceCMYK tint values (1, 1, 51, 21). As expected, in overlap areas 10, 11, 14, and 15, where color matched element 2' overlaps color matched element 1', color matched element 1' no longer contributes color because of the minor shift in colors. Thus, document 102 is no longer a visual match for document 100.

Figure 3:
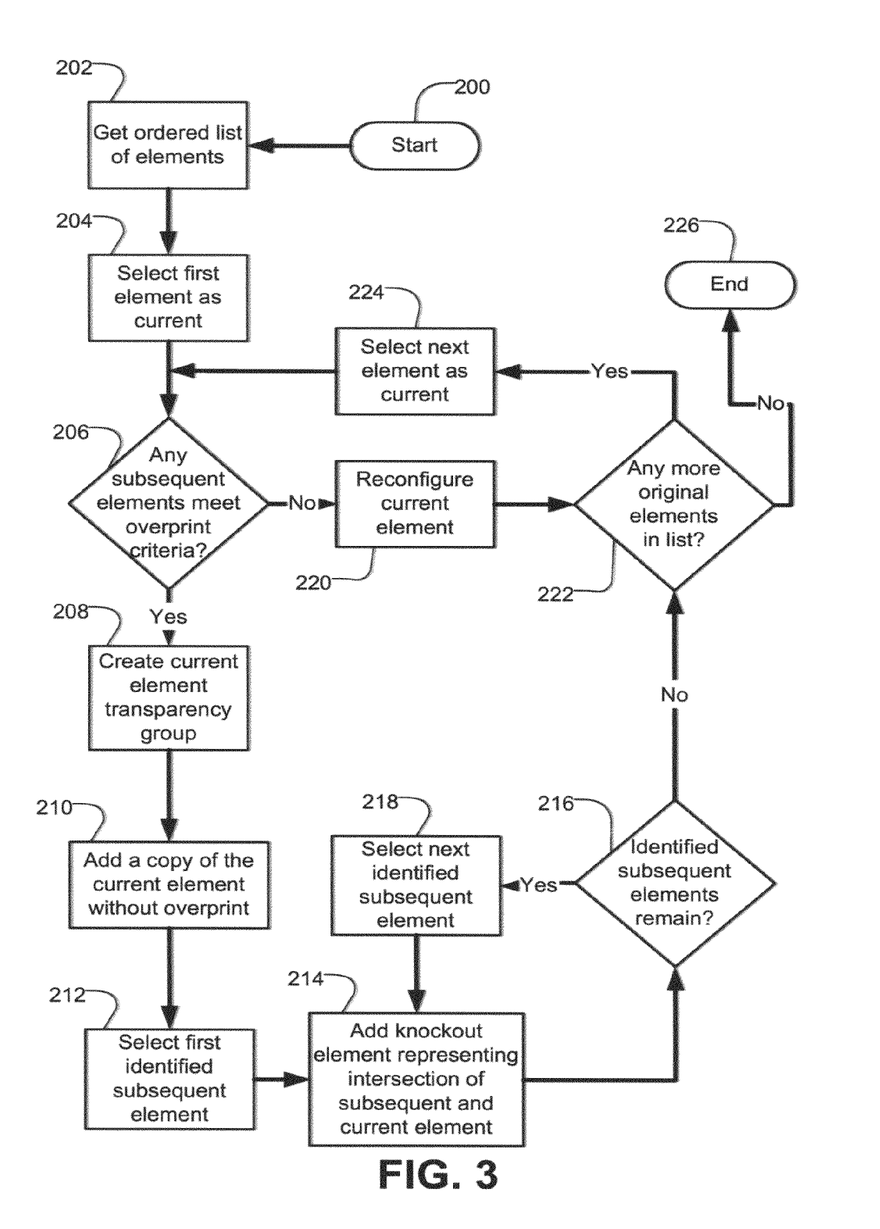
FIG. 3 is a flow chart diagram illustrating a method for converting documents according to the present invention.

FIG. 3 is a flow chart diagram illustrating a method for converting documents according to the present invention. This basic method is preferably carried out by a computer system, such as one disclosed in U.S. patent application Ser. Nos. 11/122,090 and 11/880,330. The method begins at block 200 and proceeds to block 202 where a display-ordered list of graphic elements is determined, for example, by analyzing the page description language of document 100.

Proceeding at block 204, the method selects the first graphic element from the ordered list as the current element and proceeds to block 206 where the method determines whether any original subsequent elements in the list meet an overlapping overprint criteria in relation to the original current element. For clarity, since the method involves reconfiguring and/or adding copies of elements, when referring to a graphic element, the term original is used to identify the element as it was originally defined in document 100.

Determining whether an original subsequent element meets the overlapping overprint criteria in relation to the original current element first involves determining whether any subsequent element overlaps the current element. A variety of methods, including ones similar to those disclosed in U.S. patent application Ser. Nos. 11/122,090 and 11/880,330, can be used to determine overlapping elements. In a preferred embodiment, the following conditions are used to determine if a subsequent element meets the overlapping overprint criteria:

- the subsequent element overlaps the current element,
- the subsequent element is configured to overprint, and
- the subsequent element and the current element are both configured to paint in at least one common color channel.

If one or more original subsequent elements are identified by the above criteria, the method proceeds to block 208 where a transparency group is created to replace the original current element. If no original subsequent elements are identified by the above criteria, the method instead proceeds to block 220, where the current element is reconfigured if overprinting was enabled, or otherwise left unmodified. Reconfiguration of the current element includes disabling overprint and enabling multiply blend mode transparency. After block 220, the method proceeds to block 222, described below.

In a preferred embodiment, the current element transparency group is configured to combine the color of its constituent elements in isolation from the background of the original current element. Further, the group is also configured so that constituent elements knockout background element colors within the group. Also, the group is configured with a blend mode that depends on the overprint setting of the original current element. In particular, if the original current element is configured to overprint, the group is configured with multiply blend mode to simulate the effect of overprinting. Otherwise, the group is configured with normal blend mode.

In some embodiments, if the original current element is not configured to overprint, a transparency group need not be configured to blend the color of replacement elements envelope replacement elements for the original current element, as described below. Since the original current element knocks out color of the background, there is no need to isolate the blending of color of the replacement elements and eliminating the transparency group may be an optimization.

Proceeding at block 210, the method adds a copy of the original current element to the transparency group and that element is configured to paint first and to knockout color (e.g. disable overprint if enabled).

Proceeding at block 212, the method selects the first subsequent element identified as matching the overlapping overprint criteria. Then, at block 214, an intersection knockout element, based on the original subsequent element and the original current element is added to the transparency group. The geometry of the intersection knockout element is configured to represent the intersection of the basis elements.

In a preferred embodiment an intersection knockout element is created by creating a clipping path based on the original subsequent element and clipping a copy of the original current element accordingly. Precise clipping can be important at boundaries of overlaps areas and can be problematic with clipping paths for some types of elements. Curved path segments may not be able to precisely match the outline of some text glyphs and radial blends for example. In these cases, boundary artifacts may occur which may be acceptable or can be treated using other methods such as those discussed in the first related application.

In some embodiments, as an optimization, where multiple subsequent elements paint the same color channels in common with the original element, a single compound clipping path can be generated based on the multiple subsequent elements.

In some embodiments, as an optimization, where a subsequent element paints in all of the color channels painted by an original current element which is configured to overprint, the knockout element becomes a white knockout element and no clipping path is required (i.e. the knockout element has the shape of the subsequent element). Since the current element transparency group will multiply color with the background of the original current element, a white knockout element will not affect background color when multiplied with the background.

The color of the intersection knockout element is reconfigured to knockout color channels of the current element copy that should not contribute in relation to the colors painted by the original subsequent element. This can include configuring 0% tints for those color channels being knocked out and leaving the tint values of the original current element for the remaining color channels.

Proceeding at block 216, the method determines if there are any remaining intersection areas corresponding to the list of identified subsequent element matching the overlapping overprint criteria. If there are, the method proceeds to block 218 where the next element in that list is selected for treatment at block 214. Otherwise, the method proceeds to block 222 to determine if there are additional elements in the original display-ordered list of elements.

If there are none, then the current element is the last original element and the method proceeds to block 226 and ends. Otherwise, the method proceeds to block 224 where the next original element from the display-ordered list is selected as the next current element for treatment at block 206.

Figure 4:
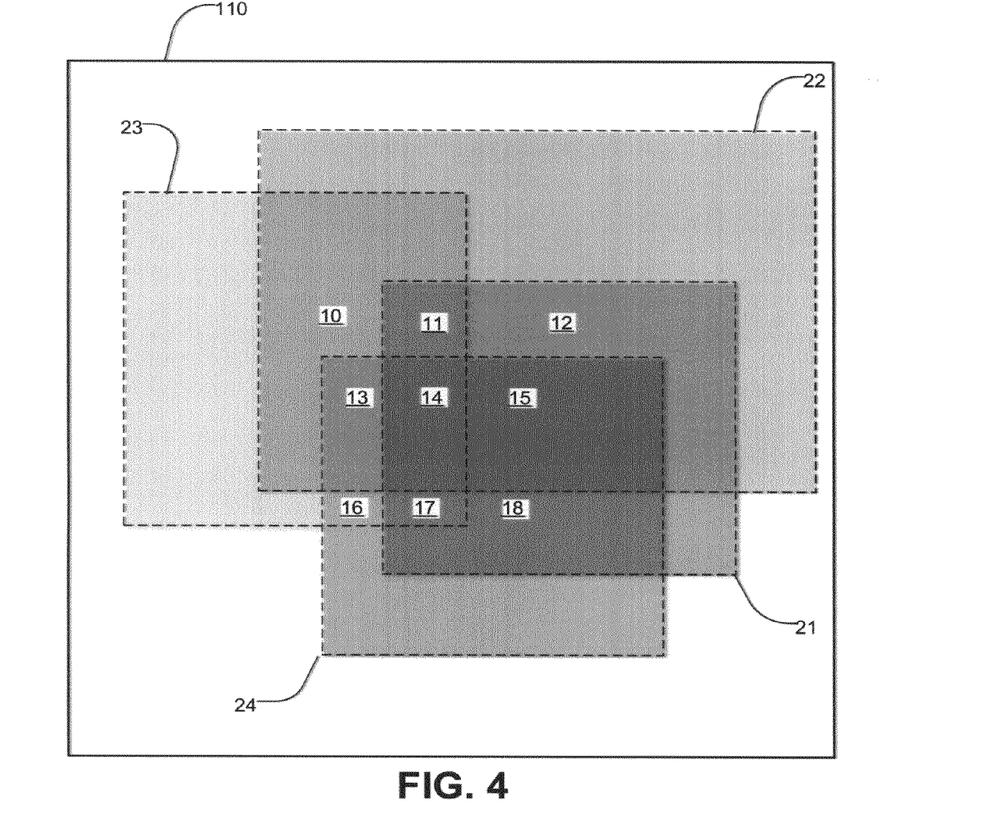
FIG. 4 is a diagram illustrating a rendering of the document of FIG. 1A after an exemplary conversion according to the present invention.

FIG. 4 is a diagram illustrating a rendering of converted document 110 after an exemplary conversion of document 100 according to the present invention. In converted document 110, transparency group 21 is configured in place of original element 1 since element 2 meets an overlapping overprint criteria in relation to element 1 as the first current element.

Accordingly, a copy of element 1 is configured to paint first within transparency group 21 and is configured to disable overprinting. In other words, an exact copy of element 1 is configured. The next element configured is based on element 1 and is clipped by element 2. In particular, since both elements 1 and 2 paint yellow colorant, this new element is the same as element 1 except with a yellow tint of zero and is clipped to paint only in overlap areas 11, 12, 14, and 15. Since this new element is configured with overprint disabled, it knocks out all color, in areas 11, 12, 14, and 15, painted by the exact duplicate of element 1 within transparency group 21.

Since the original subsequent elements 3 and 4 only paint spot colorants and do not meet the criteria, transparency group 21 includes only the two elements described above. Similarly, since the next current element is element 2, there are no subsequent original elements 1-4 meeting the overlapping overprint criteria. Therefore element 2 is reconfigured as converted element 22, with overprint disabled and with multiply blend mode transparency enabled.

The next current element selected is original element 3. Since element 4 meets an overlapping overprint criteria, transparency group 23 is configured in place of element 3. A copy of element 3 with overprint disabled is configured as the first element of transparency group 23. The next element configured is based on element 3 and is clipped by element 4. In particular, since both element 3 and 4 paint the same spot colorant, this element is the same as element 3 except with a zero spot colorant tint (e.g. paints white) and is clipped to paint only in overlap areas 13, 14, 16, and 17.

Finally, element 4 is selected as the last current element and converted element 24 is configured in place of element 4.

Converted element 24 is based on element 4 but is reconfigured to disable overprint and enable multiply blend mode transparency.

Clearly, documents 100 and 110 are visually similar in overlap areas 10-18.

Figure 5:
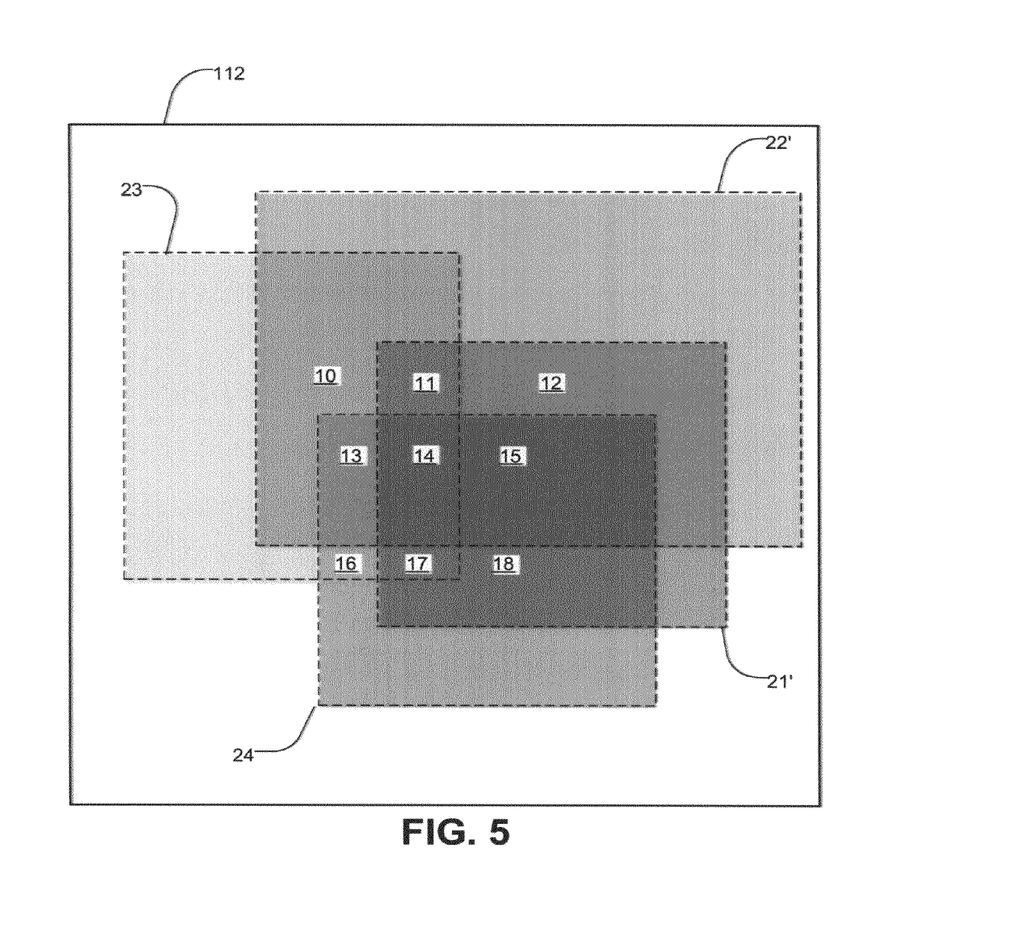
FIGS. 5 and 6 are diagrams illustrating a rendering of the document of FIG. 1A after an exemplary color matching according to the present invention.

FIG. 5 is a diagram illustrating a rendering of the document of FIG. 1A after an exemplary color matching according to the present invention. Similar to FIG. 2, assume that color matched document 112 has been produced by color matching document 110 so that spot colorants are preserved and all process colorant tints are nominally enriched by 1%. Thus, transparency group 21 is modified as color matched transparency group 21' so that the first element of color matched transparency group 21' paints with tint values of (1, 51, 100, 1) and the second element of color matched transparency group 21' paints with tint values of (1, 51, 1, 1).

Similarly, all four process colorants for converted element 22 are enriched so that color matched converted element 22' now paints with tint values (1, 1, 51, 21). Transparency group 23 and converted element 24 are unaffected by color matching since they paint only with spot colorants.

In contrast to FIG. 2, documents 110 and 112 are visually similar, despite the minor color matching modifications and thus the present invention achieves the desired results.

Figure 6:
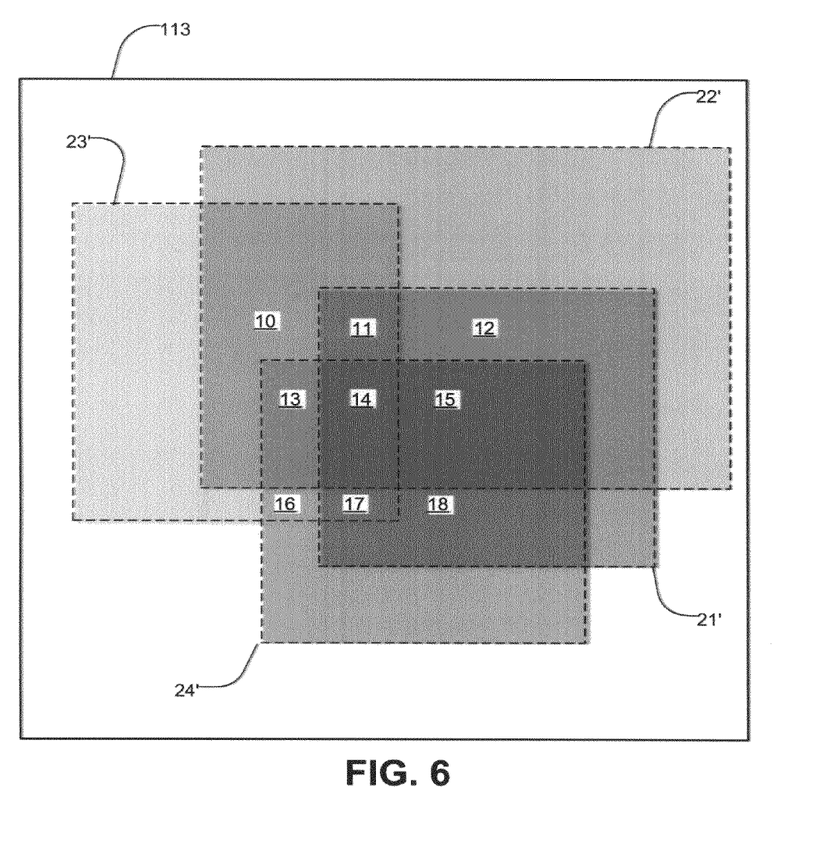

FIG. 6 is a diagram illustrating a rendering of the document of FIG. 1A after a different exemplary color matching according to the present invention. Similar to FIG. 5, assume that color matched converted document 113 has been produced by color matching converted document 110 so that all process colorant tints are nominally enriched by 1% but first including conversion of spot colorants to process recipes.

In this case, transparency group 23 and converted element 24 are now modified as color matched transparency group 23' and color matched converted element 24' respectively. Spot colorant process recipes for constituent elements are enriched to tint values of (20, 1, 19, 1) and (48, 1, 46, 1) for elements derived from elements 3 and 4 respectively. For white knockout elements in element transparency groups, such as the second element of color matched transparency group 23', color matching may leave the color as white or may optionally enrich the knockout element tint values to (1, 1, 1, 1). In either case, the resultant color in overlap areas 13, 14, 16, and 17 appears similar to the originally intended color of document 100.

In some embodiments, variations on the general method can be considered which simplify or speed the conversion process. For example, elements configured with DeviceN color spaces (e.g. may paint both process and spot colorants), may be advantageously split into multiple elements in a pre-processing step, with each replacement element painting either process colorants or one spot colorant. Replacement elements painting process colorants should be painted before spot colorants. A replacement process element should be configured similar to the original element. Replacement spot elements should be configured to enable overprinting.

The methods described herein have some limitations that may result in a hybrid approach being taken. For example, when converting a page, the methods of the present invention and other methods, such as those disclosed in the reference applications, may be evaluated to determine which achieves an optimal result. As another example, evaluation of multiple methods, may be possible on an element-wise or overlap area-wise basis such that multiple methods may be used, each for converting different parts of a page. Metrics for the evaluation can be, for example, based on the relative change in color accuracy, storage requirements and complexity of the converted document.

Embodiments of the present invention may comprise any medium which carries a set of computer-readable signals comprising instructions which, when executed by a computer processor, cause the computer processor to execute a method of the invention. Embodiments may be in any of a wide variety of forms. Embodiments may comprise, for example, physical media such as magnetic storage media including floppy diskettes, hard disk drives, optical data storage media including CD ROMs, DVDs, electronic data storage media including ROMs, flash RAM, or the like or transmission-type media such as digital or analog communication links. The instructions may optionally be compressed and/or encrypted on the medium.

The invention has been described in detail with particular reference to certain preferred embodiments thereof, but it will be understood that variations and modifications can be effected within the scope of the invention.

| PARTS LIST | |
|---|---|
| 1 | (original) element |
| 1' | color matched element |
| 2 | (original) element |
| 2' | color matched element |
| 3 | (original) element |
| 4 | (original) element |
| 10 | overlap area |
| 11 | overlap area |
| 12 | overlap area |
| 13 | overlap area |
| 14 | overlap area |
| 15 | overlap area |
| 16 | overlap area |
| 17 | overlap area |
| 18 | overlap area |
| 21 | transparency group |
| 21' | color matched transparency group |
| 22 | converted element |
| 22' | color matched converted element |
| 23 | transparency group |
| 23' | color matched transparency group |
| 24 | converted element |
| 24' | color matched converted element |
| 100 | (original) document |
| 102 | color matched document |
| 110 | converted document |
| 112 | color matched converted document |
| 113 | color matched converted document |
| 200 | method begins |
| 202 | determine ordered list of elements |
| 204 | select first element as current |
| 206 | determine if any subsequent elements meet overprint criteria |
| 208 | create current element transparency group |
| 210 | add copy of current element without overprint |
| 212 | select first identified subsequent element |
| 214 | add intersection knockout element of subsequent and current element |
| 216 | determine if identified subsequent elements remain |
| 218 | select next identified subsequent element |
| 220 | reconfigure current element |
| 222 | determine if any more original elements in list |
| 224 | select next element as current |
| 226 | method ends |

The invention claimed is:

1. A method for converting a document including vector graphic elements comprising:
   (a) obtaining an ordered list of original graphic elements from the document with a computer;
   (b) selecting a first graphic element as a current element;
   (c) processing the current element on the computer, wherein processing comprises:

determining if any subsequent original graphic elements meet an overlapping overprint criteria in relation to the current element;
processing the current element based on the result of the determination step;

(d) repeating step (c) for each original graphic element in the ordered list;

(e) printing the document;

wherein processing the current element based on the determination step comprises:

reconfiguring the current element if the determination step identifies no subsequent original elements meeting the criteria;

if the determination step identifies any subsequent original elements meeting the criteria, creating a current element transparency group to replace the original current element;

wherein creating the current element transparency group to replace the current element comprises adding a plurality of knockout elements to the current element transparency group to represent color contributions of the current element;

wherein adding the plurality of knockout elements to the current element transparency group comprises:

adding a copy of the current element to paint first in the current element transparency group;

configuring the copy to knockout color; and adding an intersection knockout element for each original subsequent element meeting the overlapping overprint criteria.

2. A method according to claim 1 wherein adding the intersection knockout element comprises configuring the knockout element to represent a geometry of an intersection between the current element and the subsequent original element.

3. A method according to claim 2 wherein adding the intersection knockout element comprises:

configuring color for the intersection knockout element based on the color configured for the current element; and zeroing color values in the intersection knockout element for color channels painted by the subsequent original element.

4. A method according to claim 3 wherein elements configured with a wide-gamut color space are considered to paint in every process colorant of a device space.

* * * * *